US012072264B2

(12) United States Patent
Speck (10) Patent No.: US 12,072,264 B2
(45) Date of Patent: Aug. 27, 2024

(54) LEAK DETECTION SYSTEM FOR SUBSEA EQUIPMENT

(71) Applicant: ONESUBSEA IP UK LIMITED, London (GB)

(72) Inventor: Andrew J. Speck, Milton, MA (US)

(73) Assignee: ONESUBSEA IP UK LIMITED, London (GB)

( * ) Notice: Subject to any disclaimer, the term of this patent is extended or adjusted under 35 U.S.C. 154(b) by 251 days.

(21) Appl. No.: 17/754,616

(22) PCT Filed: Oct. 7, 2020

(86) PCT No.: PCT/US2020/054484
§ 371 (c)(1),
(2) Date: Apr. 7, 2022

(87) PCT Pub. No.: WO2021/071880
PCT Pub. Date: Apr. 15, 2021

(65) Prior Publication Data
US 2022/0364947 A1 Nov. 17, 2022

Related U.S. Application Data

(60) Provisional application No. 62/911,453, filed on Oct. 7, 2019.

(51) Int. Cl.
*G01M 3/04* (2006.01)
*B63G 8/38* (2006.01)
(Continued)

(52) U.S. Cl.
CPC ............ *G01M 3/04* (2013.01); *B63G 8/38* (2013.01); *B63G 8/39* (2013.01); *E21B 41/0007* (2013.01);
(Continued)

(58) Field of Classification Search
CPC ......... B63G 8/38; B63G 8/39; E21B 41/0007; G01N 21/6408; G01N 2201/0218; G01S 7/4802; G01S 7/51; G01S 17/89
See application file for complete search history.

(56) References Cited

U.S. PATENT DOCUMENTS

| 4,434,364 A | 2/1984 | Correa et al. |
| 2009/0056949 A1 | 3/2009 | McStay et al. |

(Continued)

FOREIGN PATENT DOCUMENTS

| WO | 2014035749 A1 | 3/2014 |
| WO | 2017204653 A1 | 11/2017 |

OTHER PUBLICATIONS

Extended Search Report issued in European Patent Application No. 2875341.8 dated Oct. 10, 2023, 7 pages.
(Continued)

*Primary Examiner* — Eric S. McCall
(74) *Attorney, Agent, or Firm* — Jeffrey D. Frantz (57) ABSTRACT

A leak detection system includes a light source configured to output emitted light into a region of water, and a light detector configured to receive returned light from the region of the water and to output a detector signal indicative of the returned light. The leak detection system also includes at least one controller configured to detect hydrocarbons within the region of the water in response to detecting a hydrocarbon wavelength within the returned light, to determine at least one position of the hydrocarbons within the region of the water based on a time difference between a first time at which the emitted light is output from the light source and a second time at which the returned light at the hydrocarbon wavelength is received at the light detector, and to generate a three-dimensional model of a subsea structure based on the detector signal.

18 Claims, 4 Drawing Sheets

(51) Int. Cl.
| | |
|---|---|
| *B63G 8/39* | (2006.01) |
| *E21B 41/00* | (2006.01) |
| *G01N 21/64* | (2006.01) |
| *G01S 7/48* | (2006.01) |
| *G01S 7/51* | (2006.01) |
| *G01S 17/89* | (2020.01) |

(52) U.S. Cl.
CPC ........ *G01N 21/6408* (2013.01); *G01S 7/4802* (2013.01); *G01S 7/51* (2013.01); *G01S 17/89* (2013.01); *G01N 2201/0218* (2013.01)

(56) References Cited

U.S. PATENT DOCUMENTS

2016/0266247 A1   9/2016   Hjelmstad
2017/0168162 A1   6/2017   Jungwirth
2019/0219701 A1   7/2019   Embry et al.

OTHER PUBLICATIONS

International Preliminary Report on Patentability of International Patent Application No. PCT/US2020/054484 dated Apr. 21, 2022, 7 pages.

J. Wilkinson, T. Maksym, and H. Singh, "Capabilities for Detection of Oil Spills Under Sea Ice From Autonomous Underwater Vehicles," Final Report 5.2 for the Arctic Oil Spill Response Technology—Joint Industry Programme, 2013, 104 pages.

K. Hansen, M. Fitzpatrick, P. Herring, and M. VanHaverbeke, "Heavy Oil Detection (Prototypes) Final Report," CG-D-08-09, Jun. 2009, 74 pages.

El Hussein and Marzouk, "Characterization of Petroleum Crude Oils using Laser Induced Fluorescence," J. Pet. Environ. Biotechnol., vol. 06, No. 05, 2015, 6 pages.

Search Report and Written Opinion of International Patent Application No. PCT/US2020/054484 on Feb. 2, 2021; 10 pages.

LEAK DETECTION SYSTEM FOR SUBSEA EQUIPMENT

CROSS-REFERENCE TO RELATED APPLICATION

This application is a National Stage Entry of International Application No. PCT/US2020/054484, filed Oct. 7, 2020, which claims priority to and the benefit of U.S. Provisional Application No. 62/911,453, entitled "Leak Detection System" filed Oct. 7, 2019, which is hereby incorporated by reference in its entirety for all purposes.

BACKGROUND

The present disclosure relates to a leak detection system.

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. For example, in subsea operations, hydrocarbon fluids such as oil and natural gas are obtained from a subterranean geologic formation, referred to as a reservoir, by drilling a well that penetrates the hydrocarbon-bearing geologic formation. The drilling and production systems generally include a wellhead, pumps, underwater conduits, and other equipment that enable drilling and extraction operations.

The costs associated with drilling, installing, and extracting these natural resources may be significant. Accordingly, operators may monitor the operation of the drilling and production systems to determine whether the systems are operating effectively and/or complying with regulations. For example, acoustic sensors may be used to monitor the operation and condition of the drilling and production systems, such as by detecting hydrocarbon leakage from component(s) of the drilling and production systems. Unfortunately, the underwater acoustic environment is constantly changing, thereby reducing the effectiveness of the acoustic sensors. For example, changing thermoclines and water temperatures, as well as acoustic energy generated by subsea equipment and surface vessels, may reduce the effectiveness of acoustic detection of hydrocarbon leakage.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

As explained above, the costs associated with subsea drilling and extraction operations may be significant. Accordingly, the subsea drilling and extraction operations may be monitored to determine whether equipment is operating effectively and/or complying with regulations. For example, the subsea equipment may be monitored for hydrocarbon leakage by acoustic sensors. Unfortunately, the underwater acoustic environment is constantly changing, thereby reducing the effectiveness of the acoustic sensors. For example, changing thermoclines and water temperatures, as well as acoustic energy generated by subsea equipment and surface vessels, may reduce the effectiveness of acoustic detection of hydrocarbon leakage.

In certain embodiments disclosed herein, a leak detection system that uses emitted and returned light may be utilized to detect leak(s) within subsea equipment. For example, a leak detection system may include a light source configured to output emitted light into a region of water. The leak detection system may also include a light detector configured to receive returned light from the region of the water and to output a detector signal indicative of the returned light. In addition, the leak detection system may include a controller communicatively coupled to the light detector, in which the controller is configured to receive the detector signal. The controller is also configured to detect hydrocarbons within the region of the water in response to detecting a hydrocarbon wavelength within the returned light, in which the hydrocarbon wavelength is indicative of presence of the hydrocarbons within the region of the water. In addition, the controller is configured to determine one or more positions of the hydrocarbons within the region of the water based on a time difference between a first time at which the emitted light is output from the light source and a second time at which the returned light at the hydrocarbon wavelength is received at the light detector. Furthermore, the controller is configured to generate a three-dimensional model of a subsea structure based on the detector signal, and the controller is configured to output an output signal indicative of the one or more positions of the hydrocarbons within the region of the water and the three-dimensional model of the subsea structure.

Figure 1:
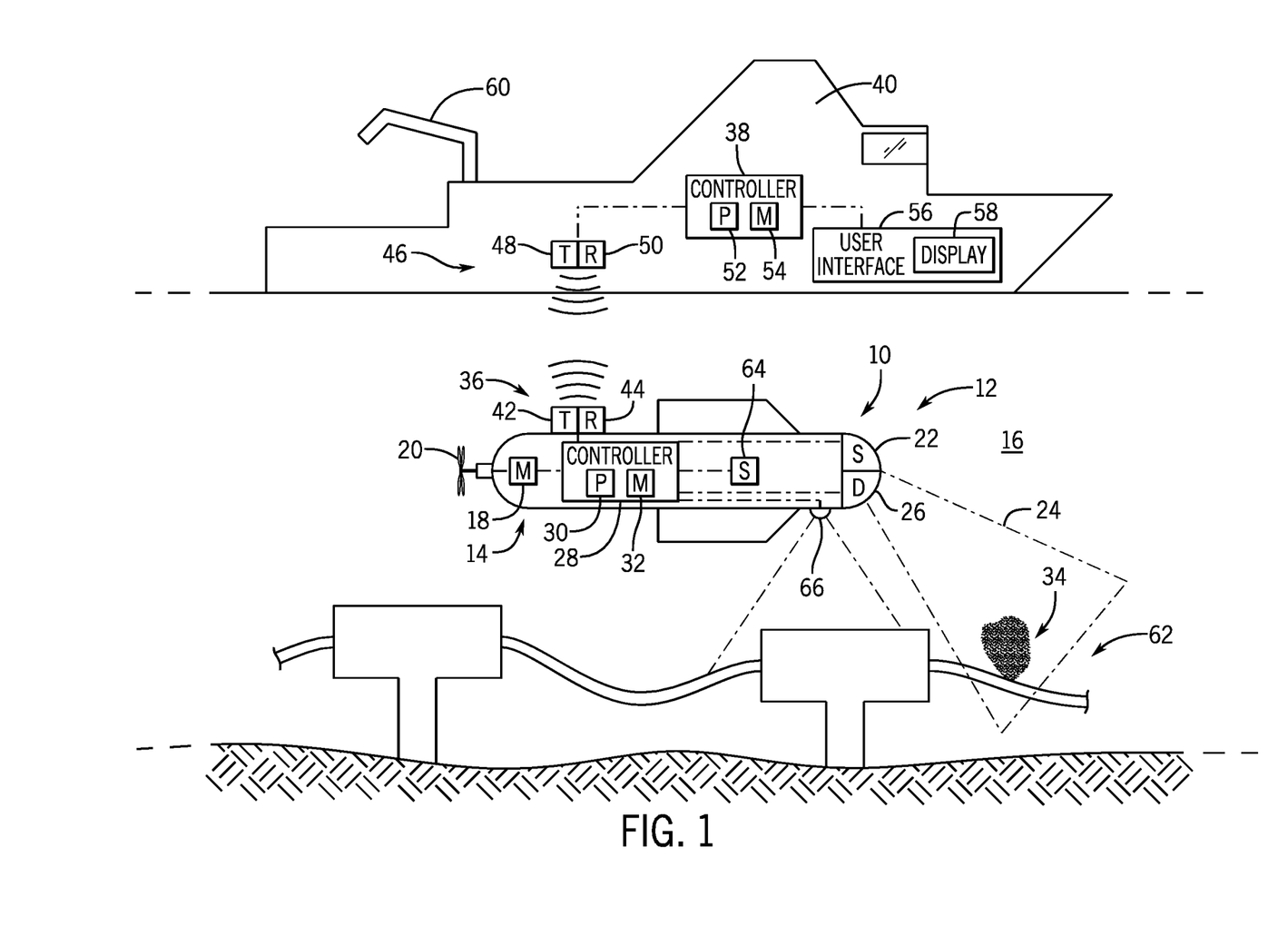
FIG. 1 is a schematic diagram of an embodiment of an underwater vehicle having an embodiment of a leak detection system.

FIG. 1 is a schematic diagram of an embodiment of an underwater vehicle 10 (e.g., autonomous underwater vehicle, remote operated underwater vehicle, etc.) having an embodiment of a leak detection system 12. In the illustrated embodiment, the underwater vehicle 10 includes a propulsion system 14 configured to control movement of the underwater vehicle 10 through water 16. As illustrated, the propulsion system 14 includes a motor 18 and a propeller 20. The motor 18 is configured to drive the propeller 20, thereby driving the underwater vehicle 10 through the water 16. The motor 18 may include an electric motor, a pneumatic motor, a hydraulic motor, any other suitable type(s) of motor(s), or a combination thereof. In addition, while the illustrated propulsion system 14 includes a single motor 18 and a single propeller 20 in the illustrated embodiment, in other embodiments, the propulsion system may include any suitable number of motors (e.g., 0, 1, 2, 3, 4, 5, 6, etc.) and/or propellers (e.g., 0, 1, 2, 3, 4, 5, 6, etc.). For example, in certain embodiments, the motor and/or the propeller may be omitted, and the propulsion system may include another suitable device/assembly configured to control movement of the underwater vehicle through the water. Furthermore, in certain embodiments, the propulsion system may control the orientation of the propeller, the orientation of one or more controllable fins, operation of one or more other propellers, or a combination thereof, to control the direction of movement of the underwater vehicle through the water.

Furthermore, in the illustrated embodiment, the leak detection system 12 includes a light source 22 (e.g., laser, etc.) configured to output emitted light into a region 24 of the water 16. In addition, the leak detection system 12 includes a light detector 26 configured to receive returned light from the region 24 of the water 16 and to output a detector signal indicative of the returned light. The leak detection system 12 also includes a controller 28 communicatively coupled to the light detector 26. In certain embodiments, the controller 28 is an electronic controller having electrical circuitry configured to receive the detector signal from the light detector 26. In the illustrated embodiment, the controller 28 includes a processor, such as the illustrated microprocessor 30, and a memory device 32. The controller 28 may also include one or more storage devices and/or other suitable components. The processor 30 may be used to execute software, such as software for processing the detector signal, and so forth. Moreover, the processor 30 may include multiple microprocessors, one or more "general-purpose" microprocessors, one or more special-purpose microprocessors, and/or one or more application specific integrated circuits (ASICS), or some combination thereof. For example, the processor 30 may include one or more reduced instruction set (RISC) processors.

The memory device 32 may include a volatile memory, such as random access memory (RAM), and/or a nonvolatile memory, such as read-only memory (ROM). The memory device 32 may store a variety of information and may be used for various purposes. For example, the memory device 32 may store processor-executable instructions (e.g., firmware or software) for the processor 30 to execute, such as instructions for processing the detector signal, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for processing the detector signal, etc.), and any other suitable data.

In the illustrated embodiment, the controller 28 is configured to detect hydrocarbons 34 within the region 24 of the water 16 in response to detecting a hydrocarbon wavelength within the returned light. As discussed in detail below, the hydrocarbon wavelength is indicative of presence of hydrocarbons within the region 24 of the water. In addition, the controller 28 is configured to determine one or more positions of the hydrocarbons 34 within the region 24 of the water 16 based on a time difference between a first time at which the emitted light is output from the light source 22 and a second time at which the returned light at the hydrocarbon wavelength is received at the light detector 26. The controller 28 is also configured to output an output signal indicative of the one or more positions of the hydrocarbons 34 within the region 24 of the water 16. Accordingly, the leak detection system 12 may detect the presence and the position(s) of hydrocarbons within the subsea environment. Because the leak detection system 12 utilizes light to detect the presence and position(s) of the hydrocarbons, the leak detection system may be significantly more accurate than a leak detection system that utilizes acoustic sensor(s) to detect hydrocarbons (e.g., because water temperature changes and/or acoustic energy generated by subsea equipment and surface vessels may reduce the effectiveness of the acoustic detection of subsea hydrocarbons).

In the illustrated embodiment, the underwater vehicle 10 includes a communication system 36 communicatively coupled to the controller 28. The communication system 36 is configured to establish communication between the controller 28 and the controller of another suitable system, such as the controller 38 of a surface vessel 40. The communication system 36 includes one or more transmitters 42 configured to output communication signal(s) and one or more receivers 44 configured to receive communication signal(s). However, in other embodiments, the communication system may include one or more transceivers configured to both output and receive communication signal(s). In the illustrated embodiment, the transmitter(s) 42 are configured to output acoustic communication signal(s) through the water 16, and the receiver(s) 44 are configured to receive acoustic communication signal(s) via the water 16. For example, the communication system 36 may include one or more acoustic modems. While the communication system 36 is configured to communicate via acoustic communication signal(s) in the illustrated embodiment, in other embodiments, the communication system may be configured to communicate via any other suitable communication signal(s), such as wireless radio frequency communication signal(s), wired radio frequency communication signal(s), optical communication signal(s) (e.g., via fiber optic cable(s)), or any other suitable communication signal(s) or combination of suitable communication signal(s).

In the illustrated embodiment, the controller 28 of the underwater vehicle 10 is configured to communicate with the controller 38 of the surface vessel 40 (e.g., boat, ship, platform, etc.) via the communication system 36 of the underwater vehicle 10 and a corresponding communication system 46 of the surface vessel 40. The communication system 46 of the surface vessel 40 includes one or more transmitters 48 configured to output communication signal(s) and one or more receivers 50 configured to receive communication signal(s). However, in other embodiments, the communication system may include one or more transceivers configured to both output and receive communication signal(s). In the illustrated embodiment, the transmitter(s) 48 are configured to output acoustic communication signal(s) through the water 16, and the receiver(s) 50 are configured to receive acoustic communication signal(s) via the water 16. For example, the communication system 46 may include one or more acoustic modems. While the communication system 46 is configured to communicate via acoustic communication signal(s) in the illustrated embodiment, in other embodiments, the communication system may be configured to communicate via any other suitable communication signal(s), such as wireless radio frequency communication signal(s), wired radio frequency communication signal(s), optical communication signal(s) (e.g., via fiber optic cable(s)), or any other suitable communication signal(s) or combination of suitable communication signal(s). Furthermore, while the communication systems of the underwater vehicle and the surface vessel are configured to communicate with one another in the illustrated embodiment, in other embodiments, at least one of the communication systems may be configured to communicate with other suitable communication system(s), such as the communication system of another surface vessel, the communication system of another underwater vehicle, the communication system of a remote control center, other suitable communication system(s), or a combination thereof.

As illustrated, the communication system 46 of the surface vessel 40 is communicatively coupled to the controller 38 of the surface vessel 40. Accordingly, the controller 38 of the surface vessel 40 may communicate with the controller 28 of the underwater vehicle 10 via the respective communication systems. In certain embodiments, the controller 38 of the surface vessel 40 is an electronic controller having electrical circuitry configured to provide instructions to the underwater vehicle controller 28 and/or to receive data from the underwater vehicle controller 28. In the illustrated embodiment, the controller 38 includes a processor, such as the illustrated microprocessor 52, and a memory device 54. The controller 38 may also include one or more storage devices and/or other suitable components. The processor 52 may be used to execute software, such as software for providing instructions to and/or receiving data from the underwater vehicle controller, and so forth. Moreover, the processor 52 may include multiple microprocessors, one or more "general-purpose" microprocessors, one or more special-purpose microprocessors, and/or one or more application specific integrated circuits (ASICS), or some combination thereof. For example, the processor 52 may include one or more reduced instruction set (RISC) processors.

The memory device 54 may include a volatile memory, such as random access memory (RAM), and/or a nonvolatile memory, such as read-only memory (ROM). The memory device 54 may store a variety of information and may be used for various purposes. For example, the memory device 54 may store processor-executable instructions (e.g., firmware or software) for the processor 52 to execute, such as instructions for providing instructions to and/or receiving data from the underwater vehicle controller 28, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for providing instructions to and/or receiving data from the underwater vehicle controller 28, etc.), and any other suitable data.

In the illustrated embodiment, the surface vessel 40 includes a user interface 56 communicatively coupled to the controller 38. The user interface 56 may include one or more suitable controls configured to provide input to the surface vessel controller 38. In addition, the user interface 56 may include one or more suitable interfaces configured to present information to an operator of the surface vessel 40. For example, in the illustrated embodiment, the user interface 56 includes a display 58 configured to present visual information to the surface vessel operator. In addition, in certain embodiments, the display 58 may include a touch screen interface configured to receive input from the surface vessel operator. By way of example, the surface vessel operator may provide instructions to the underwater vehicle 10 (e.g., to control the position of the underwater vehicle, to control operation of the leak detection system, etc.) via the user interface 56, and the instructions may be output to the underwater vehicle controller 28 via the surface vessel controller 38, the surface vessel communication system 46, and the underwater vehicle communication system 36. In addition, in certain embodiments, the leak detection system 12 may output data (e.g., position data, image data, etc.) to the user interface 56 (e.g., the display 58 of the user interface 56) via the underwater vehicle controller 28, the underwater vehicle communication system 36, the surface vessel communication system 46, and the surface vessel controller 38. Furthermore, in certain embodiments, the underwater vehicle and/or the leak detection system may receive instructions from and/or output data to any other suitable user interface (e.g., of a remote facility, etc.).

In the illustrated embodiment, the surface vessel 40 includes a crane 60 configured to enable deployment and retrieval of the underwater vehicle 10. For example, the surface vessel 40 may transport the underwater vehicle 10 to a deployment site and then deploy the underwater vehicle 10 via the crane 60. The deployment site may include a subsea structure and/or undersea equipment 62 configured to transport and/or store hydrocarbons. For example, the deployment site may include a variety of oil and gas infrastructure, such as production pipe(s), subsea wellhead(s), riser(s), pumping equipment, other suitable subsea structure(s) and/or undersea equipment, or a combination thereof. At the deployment site, the underwater vehicle 10 may use the leak detection system 12 to monitor the water 16 around the subsea structure/undersea equipment 62 for hydrocarbons, thereby facilitating detection of a leak. In addition to leak detection, the underwater vehicle 10 may perform maintenance operations, inspection operations, mapping operations, research operations, other suitable operations, or a combination thereof. For example, in certain embodiments, the underwater vehicle 10 may include one or more suitable sensors 64 (e.g., temperature sensor(s), pressure sensor(s), sonar sensor(s), etc.) communicatively coupled to the controller 28 and configured to facilitate performance of the other operation(s).

As previously discussed, the light source 22 is configured to output emitted light into the region 24 of the water 16, and the light detector 26 is configured to receive returned light from the region 24 of the water 16 and to output a detector signal indicative of the returned light to the controller 28. The controller 28 is configured to detect hydrocarbons 34 within the region 24 of the water 16 in response to detecting a hydrocarbon wavelength within the returned light indicative of presence of the hydrocarbons 34 within the region 24 of the water 16. In addition, the controller 28 is configured to determine one or more positions of the hydrocarbons 34 within the region 24 of the water 16 based on a time difference between a first time at which the emitted light is output from the light source 22 and a second time at which the returned light at the hydrocarbon wavelength is received at the light detector 26.

In certain embodiments, the one or more positions of the hydrocarbons 34 include multiple positions of the hydrocarbons 34. In such embodiments, the controller 28 may generate a three-dimensional model of the hydrocarbons 34 within the region 24 of the water 16 based on the positions of the hydrocarbons 34. In addition, the controller 28 is configured to output an output signal indicative of the three-dimensional model of the hydrocarbons within the region 24 of the water 16. For example, the controller 28, which is communicatively coupled to the light source 22 in the illustrated embodiment, may instruct the light source 22 to move through a scanning pattern (e.g., including up/down movement and/or left/right movement), such that the emitted light (e.g., a beam of the emitted light) scans through the region 24 (e.g., volume) of the water 16. In addition, the controller 28 may instruct the light source 22 to emit pulses of the emitted light as the light source 22 moves through the scanning pattern. After each pulse of the emitted light, the controller 28 may determine the position of a respective portion of the hydrocarbons 34 within the region 24 based on a time difference between a first time at which the emitted light is output from the light source 22 and a second time at which the returned light at the hydrocarbon wavelength is received at the light detector 26. Once the scanning pattern is complete, the controller 28 may generates a three-dimensional model (e.g., a point cloud, a polygon mesh, etc.) of the hydrocarbons based on the determined positions of the hydrocarbons and output the output signal indicative of the three-dimensional model. For example, the controller 28 may output the output signal indicative of the three-dimensional model to the user interface 56 (e.g., the display 58 of the user interface 56) via the communication system 36 of the underwater vehicle, the communication system 46 of the surface vessel 40, and the controller 38 of the surface vessel 40. The user interface 56 (e.g., the display 58 of the user interface 56) may present an image of the three-dimensional model to the surface vessel operator, thereby enabling the surface vessel operator to view the size and shape of the hydrocarbons 34 within the region 24 of the water 16.

In certain embodiments, the controller is configured to determine the position(s) of the hydrocarbons relative to the subsea structure/undersea equipment 62, which is configured to contain the hydrocarbons, based on a first position of the light detector 26 and a second position of the subsea structure/undersea equipment 62. Accordingly, the operator may be able to determine a location of a hydrocarbon leak within the subsea structure/undersea equipment 62 based on the position(s) of the detected hydrocarbons relative to the subsea structure/undersea equipment 62. For example, in certain embodiments, the controller 28 may output an output signal indicative of the one or more positions of the hydrocarbons and a three-dimensional model of the subsea structure/undersea equipment. Based on the position(s) of the hydrocarbons relative to the subsea structure/undersea equipment 62 and the three-dimensional model of the subsea structure/undersea equipment, the operator may determine a particular location on the subsea structure/undersea equipment 62 that is leaking hydrocarbons, thereby facilitate maintenance operations. Furthermore, in certain embodiments, the one or more positions of the hydrocarbons 34 relative to the subsea structure/undersea equipment 62 include multiple positions of the hydrocarbons 34 relative to the subsea structure/undersea equipment 62, and the controller 28 is configured to generate a three-dimensional model of the hydrocarbons 34 within the region 24 of the water 16 based on the positions of the hydrocarbons 34 relative to the subsea structure/undersea equipment 62. In such embodiments, the controller 28 may output an output signal indicative of the three-dimensional model of the hydrocarbons and the three-dimensional model of the subsea structure/undersea equipment. Based on the three-dimensional model of the hydrocarbons 34 and the three-dimensional model of the subsea structure/undersea equipment, the operator may determine a particular location on the subsea structure/undersea equipment 62 that is leaking hydrocarbons, thereby facilitate maintenance operations. While the controller is configured to determine the position(s) of the hydrocarbons relative to the subsea structure/undersea equipment in the embodiments disclosed herein, in other embodiments, the controller may be configured to determine the position(s) of the hydrocarbons relative to any other suitable reference (e.g., the sea floor, the surface of the water, etc.).

The three-dimensional model of the subsea structure/undersea equipment 62 may be stored within the memory 32 of the controller 28. For example, the three-dimensional model of the subsea structure/undersea equipment 62 may correspond to a computer-aided design (CAD) model of the subsea structure/undersea equipment 62. Alternatively or additionally, the three-dimensional model of the subsea structure/undersea equipment 62 may be generated by scanning the subsea structure/undersea equipment during a previous inspection operation (e.g., via a light detection and ranging (LIDAR) system, via optical cameras, etc.) and then stored within the memory 32 of the controller 28.

Furthermore, in certain embodiments, the leak detection system 12 includes a LIDAR system 66 communicatively coupled to the controller 28. The LIDAR system 66 is configured to scan the subsea structure/undersea equipment 62 with one or more lasers and to output a LIDAR signal indicative of the three-dimensional model of the subsea structure/undersea equipment 62. For example, the LIDAR signal may be indicative of a point cloud of points on the surface of the subsea structure/undersea equipment 62. The controller 28 may generate the three-dimensional model of the subsea structure/undersea equipment 62 based on the LIDAR signal. In addition, the LIDAR system may enable mapping of the seafloor, scanning of other underwater equipment, searching for various undersea structures, and navigation of the underwater vehicle (e.g., by identifying objects in the path of the underwater vehicle, etc.), among other functions.

Furthermore, in certain embodiments, the controller 28 is configured to generate the three-dimensional model of the subsea structure/undersea equipment based on the detector signal indicative of the returned light. For example, the returned light may include light at the hydrocarbon wavelength and light substantially at the emitted wavelength of the emitted light. As previously discussed, the returned light at the hydrocarbon wavelength is indicative of hydrocarbons within the water. In addition, the returned light substantially at the emitted wavelength may be reflected from the subsea structure/undersea equipment. As discussed in detail below, the controller may generate the three-dimensional model of the subsea structure/undersea equipment based on the returned light substantially at the emitted wavelength. Accordingly, using the two different wavelengths, the controller 28 may generate the three-dimensional model of the hydrocarbons and the three-dimensional model of the subsea structure/undersea equipment.

As used herein, "three-dimensional model" of the subsea structure/undersea equipment refers to a model of at least a portion of at least the outer surface of the subsea structure/undersea equipment. The three-dimensional model of the subsea structure/undersea equipment may include the entirety of at least the outer surface, and/or the three-dimensional model of the subsea structure/undersea equipment may include at least a portion of the entirety of the subsea structure/undersea equipment. Furthermore, while accessing a stored three-dimensional model of the subsea structure/undersea equipment, generating the three-dimensional model of the subsea structure/undersea equipment based on the LIDAR signal, and generating the three-dimensional model of the subsea structure/undersea equipment based on the detector signal indicative of the returned light are disclosed above, in other embodiments, the three-dimensional model of the subsea structure/undersea equipment may be generated based on other suitable data and/or received from a suitable source. Furthermore, in certain embodiments, the three-dimensional model of the subsea structure/undersea equipment may be generated based on data from multiple sources (e.g., data stored within the controller memory, data from the LIDAR signal, data from the detector signal, other suitable data, or a combination thereof). For example, in certain embodiments, the leak detection system may include multiple LIDAR systems and/or multiple light detectors (e.g., and multiple light sources or a single light source), and the controller may generate the three-dimensional model of the subsea structure/undersea equipment based on data from the multiple LIDAR system and/or data from the multiple light detectors.

In certain embodiments, the controller 28 is configured to automatically determine a location of the leak on the subsea structure/undersea equipment based on the three-dimensional model of the hydrocarbons 34 and the three-dimensional model of the subsea structure/undersea equipment 62. For example, the three-dimensional model of the hydrocarbons may form a plume shape extending from a narrowest region to a widest region (e.g., as the hydrocarbons disperse from the source of the leak into the surrounding water). The controller 28 may be configured to determine that the location of the leak is at the point on the subsea structure/undersea equipment closest to the narrowest region of the plume. Furthermore, in certain embodiments, the controller 28 may be configured to determine whether the leak originates from the subsea structure/undersea equipment or another source (e.g., a natural seep through the seafloor) based on the position(s) of the hydrocarbons (e.g., the three-dimensional model of the hydrocarbons) and the three-dimensional model of the subsea structure/undersea equipment.

In the illustrated embodiment, the controller 28 of the underwater vehicle 10 is communicatively coupled to the propulsion system 14. In certain embodiments, the controller 28 is configured to control the propulsion system 14 to move the underwater vehicle 10 to a position and/or an orientation that directs the light source 22 and the light detector 26 toward an intersection of the hydrocarbons and the subsea structure/undersea equipment, thereby facilitating identification of the source of the leak (e.g., by the operator or automatically by the controller). In certain embodiments, the controller may determine the intersection of the hydrocarbons and the subsea structure/undersea equipment based on the positions of the hydrocarbons (e.g., the three-dimensional model of the hydrocarbons) and the three-dimensional model of the subsea structure/undersea equipment.

Furthermore, in certain embodiments, the controller 28 is configured to control the propulsion system 14 to move the underwater vehicle 10 to multiple locations while directing the light source 22 and the light detector 26 toward the region 24 of the water 16 to enable the controller 28 to determine an increased number of positions of the hydrocarbons 34 within the region 24 of the water 16. The controller 28 may use the increased number of positions of the hydrocarbons 34 to enhance the detail and/or increase the completeness of the three-dimensional model of the hydrocarbons. For example, the controller may control the propulsion system to move the underwater vehicle to a first location relative to the subsea structure/undersea equipment and to direct the light source and the light detector toward the region of the water. The controller may then determine a first set of positions of the hydrocarbons within the region of the water. Next, the controller may control the propulsion system to move the underwater vehicle to a second location relative to the subsea structure/undersea equipment and to direct the light source and the light detector toward the region of the water. The controller may then determine a second set of positions of the hydrocarbons within the region of the water. The process may repeat until a target number of sets of positions is determined. The controller may then generate the three-dimensional model of the hydrocarbons based on the sets of positions of the hydrocarbons. Furthermore, in certain embodiments, the controller may generate the three-dimensional model of the subsea structure/undersea equipment based on data from the LIDAR signal and/or data from the detector signal collected at each location of the underwater vehicle, thereby enhancing the detail and/or increasing the completeness of the three-dimensional model of the subsea structure/undersea equipment.

In certain embodiments, the controller 28 may be configured to determine a concentration of the hydrocarbons 34 within the region 24 of the water 16. For example, the controller 28 may determine the hydrocarbon concentration based on a magnitude of the returned light at the hydrocarbon wavelength and the position of the hydrocarbons 34. For example, a higher magnitude of the returned light at the hydrocarbon wavelength and a greater distance between the light detector 26 and the hydrocarbons 34 may indicate a higher concentration of hydrocarbons. In addition, a lower magnitude of the returned light at the hydrocarbon wavelength and a smaller distance between the light detector 26 and the hydrocarbons 34 may indicate a lower concentration of the hydrocarbons. In embodiments in which the controller is configured to generate a three-dimensional model of the hydrocarbons within the region of the water, the controller may determine the hydrocarbon concentration at each hydrocarbon position, thereby establishing a three-dimensional hydrocarbon concentration model. Such a model may be used by the operator to determine the location of the hydrocarbon leak within the subsea structure/undersea equipment (e.g., the higher concentration may be located closer to the source of the leak). Furthermore, in certain embodiments, the controller 28 may automatically determine the location of the hydrocarbon leak within the subsea structure/undersea equipment based on the three-dimensional hydrocarbon concentration model (e.g., alone or in combination with the three-dimensional model of the hydrocarbons) and the three-dimensional model of the subsea structure/undersea equipment. For example, the controller may automatically determine the location of the leak by determining the point on the subsea structure/undersea equipment closest to the highest concentration of the hydrocarbons. In certain embodiments, the controller 28 is configured to control the propulsion system 14 to move the underwater vehicle 10 to a location and/or an orientation that directs the light source 22 and the light detector 26 toward a portion of the hydrocarbons having a highest concentration, thereby facilitating identification of the source of the leak (e.g., by the operator or automatically by the controller).

Furthermore, in certain embodiments, the controller 28 may determine a one-dimensional or two-dimensional concentration gradient by determining the hydrocarbon concentration at each position of the multiple hydrocarbon positions. In certain embodiments, the controller may determine the intersection of the hydrocarbons and the subsea structure/undersea equipment based on the concentration gradient and the three-dimensional model of the subsea structure/undersea equipment. The controller 28 may then control the propulsion system 14 to move the underwater vehicle 10 to a position and/or an orientation that directs the light source 22 and the light detector 26 toward the intersection of the hydrocarbons and the subsea structure/undersea equipment, thereby facilitating identification of the source of the leak (e.g., by the operator or automatically by the controller).

While the leak detection system 12 includes a single light source and a single light detector in the illustrated embodiment, in other embodiments, the leak detection system may include additional light sources (e.g., 1, 2, 3, 4, or more) and/or additional light detectors (e.g., 1, 2, 3, 4, or more). For example, the leak detection system may include a second light source configured to emit light into a second region of the water and a second light detector configured to receive returned light from the second region of the water. Furthermore, the controller may receive a second detector signal from the second light detector and detect hydrocarbons within the second region of the water in response to detecting the hydrocarbon wavelength within the returned light. The controller may also determine one or more positions of the hydrocarbons based on a time difference between a first time at which the emitted light is output from the second light source and a second time at which the respective returned light at the hydrocarbon wavelength is received at the second light detector. In certain embodiments, the one or more positions of the hydrocarbons include multiple positions of the hydrocarbons. In such embodiments, the controller may generate a three-dimensional model of the hydrocarbons within the second region of the water based on the positions of the hydrocarbons. Furthermore, in certain embodiments, the leak detection system may include a single light source and multiple light detectors (e.g., 2, 3, 4, or more) each configured to receive the returned light.

While the controller 28 is configured to output the output signal (e.g., to the controller of the surface vessel, etc.) indicative of the position(s) of the hydrocarbons, the three-dimensional model of the hydrocarbons, the three-dimensional model of the subsea structure/undersea equipment, other data, or a combination thereof, in the illustrated embodiment, in other embodiments, the controller may be configured to store at least a portion of the data (e.g., alone or in addition to outputting the output signal). Furthermore, in the illustrated embodiment, the controller 28 is used to perform certain functions disclosed above, including but not limited to detecting hydrocarbons, determined position(s) of the hydrocarbons, generating a three-dimensional model of the hydrocarbons, and generating a three-dimensional model of the subsea structure/undersea equipment. However, in other embodiments, these functions, among others, may be performed by another suitable controller (e.g., the surface vessel controller, etc.) or a combination of controllers (e.g., the underwater vehicle controller and the surface vessel controller, etc.).

Figure 2:
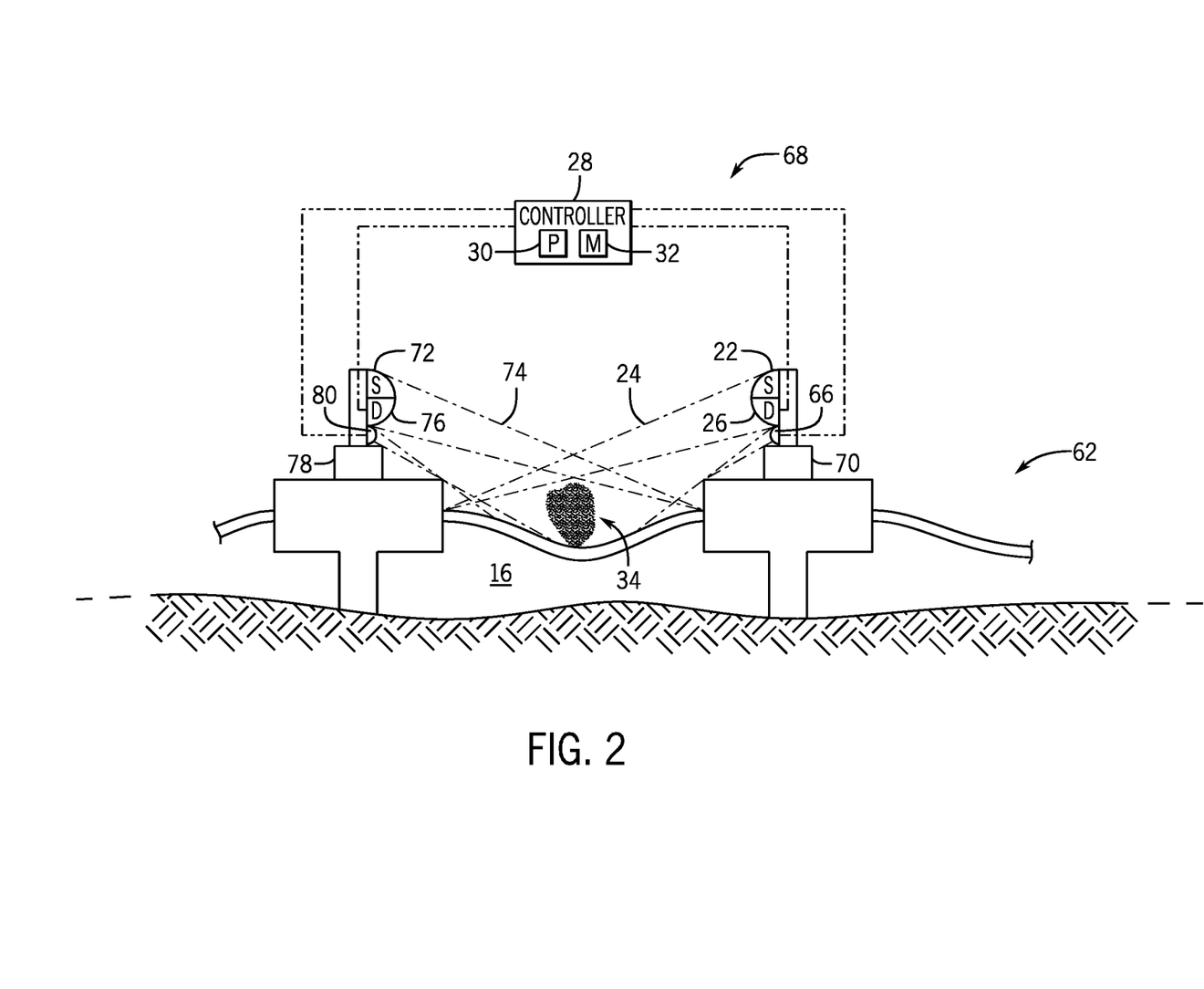
FIG. 2 is a schematic diagram of an embodiment of undersea equipment and an embodiment of a leak detection system coupled to the undersea equipment.

FIG. 2 is a schematic diagram of an embodiment of undersea equipment 62 and an embodiment of a leak detection system 68 coupled to the undersea equipment 62. In the illustrated embodiment, the leak detection system 68 includes a first light source 22 configured to output emitted light into a first region 24 of the water 16 adjacent to the subsea structure/undersea equipment 62. In addition, the leak detection system 68 includes a first light detector 26 configured to receive returned light from the first region 24 of the water 16 and to output a first detector signal indicative of the returned light. The leak detection system 68 also includes a first mount 70 that couples the first light source 22 and the first light detector 26 to the subsea structure/undersea equipment 62. The first mount 70 may include any suitable device or assembly configured to couple the first light source and the first light detector to the subsea structure/undersea equipment 62. For example, the first mount may include one or more fasteners (e.g., bolt(s), screw(s), rivet(s), pin(s), etc.), one or more connectors (e.g., latch/latches, interface(s), etc.), one or more supports (e.g., rod(s), plate(s), weldment(s), casting(s), etc.), other suitable mounting element(s), or a combination thereof.

Furthermore, the leak detection system 68 includes a controller 28 communicatively coupled to the light detector 26 and having a processor 30 and a memory 32. As previously discussed with regard to the embodiments of FIG. 1, the controller 28 is configured to receive the first detector signal and to detect hydrocarbons 34 within the first region 24 of the water 16 in response to detecting the hydrocarbon wavelength within the returned light, in which the hydrocarbon wavelength is indicative of presence of the hydrocarbons 34 within the first region 24 of the water 16. The controller 28 is also configured to determine one or more positions of the hydrocarbons 34 relative to the subsea structure/undersea equipment 62 based on a time difference between a first time at which the emitted light is output from the first light source 22 and a second time at which the returned light at the hydrocarbon wavelength is received at the first light detector 26. Furthermore, the controller 28 is configured to output an output signal indicative of the one or more positions of the hydrocarbons 34 within the first region 24 of the water 16. In certain embodiments, the controller is communicatively coupled to a user interface (e.g., having a display), and the user interface (e.g., the display of the user interface) is configured to present an image of the position(s) of the hydrocarbons 34 and an image of the three-dimensional model of the subsea structure/undersea equipment, thereby enabling an operator to determine a location of a hydrocarbon leak within the subsea structure/undersea equipment. In certain embodiments, the one or more positions of the hydrocarbons 34 include multiple positions of the hydrocarbons 34. In such embodiments, the controller 28 may generate a three-dimensional model of the hydrocarbons 34 within the region 24 of the water 16 based on the positions of the hydrocarbons 34, and the output signal may be indicative of the three-dimensional model of the hydrocarbons (e.g., and the three-dimensional model of the undersea equipment). In addition, the user interface (e.g., the display of the user interface) may present an image of the three-dimensional model of the hydrocarbons and an image of the three-dimensional model of the undersea equipment.

In the illustrated embodiment, the leak detection system 68 includes a second light source 72 configured to output emitted light into a second region 74 of the water 16 adjacent to the subsea structure/undersea equipment 62. In addition, the leak detection system 68 includes a second light detector 76 configured to receive respective returned light from the second region 74 of the water 16 and to output a second detector signal indicative of the respective returned light. The leak detection system 68 also includes a second mount 78 that couples the second light source 72 and the second light detector 76 to the subsea structure/undersea equipment 62. The second mount 78 may include any suitable device or assembly configured to couple the second light source and the second light detector to the subsea structure/undersea equipment 62. For example, the second mount may include one or more fasteners (e.g., bolt(s), screw(s), rivet(s), pin(s), etc.), one or more connectors (e.g., latch/latches, interface(s), etc.), one or more supports (e.g., rod(s), plate(s), weldment(s), casting(s), etc.), other suitable mounting element(s), or a combination thereof.

Furthermore, the controller 28 is configured to receive the second detector signal and to detect hydrocarbons 34 within the second region 74 of the water 16 in response to detecting the hydrocarbon wavelength within the returned light, in which the hydrocarbon wavelength is indicative of presence of the hydrocarbons 34 within the second region 74 of the water 16. The controller 28 is also configured to determine one or more positions of the hydrocarbons 34 relative to the subsea structure/undersea equipment 62 based on a time difference between a first time at which the emitted light is output from the second light source 72 and a second time at which the respective returned light at the hydrocarbon wavelength is received at the second light detector 76. In certain embodiments, the one or more positions of the hydrocarbons 34 include multiple positions of the hydrocarbons 34. In such embodiments, the controller 28 may generate a three-dimensional model of the hydrocarbons 34 within the second region 74 of the water 16 based on the positions of the hydrocarbons 34.

In the illustrated embodiment, the first region 24 and the second region 74 overlap one another. Accordingly, the controller 28 may utilize the positions of the hydrocarbons determined based on feedback from the first light detector 26 and the positions of the hydrocarbons determined based on feedback from the second light detector 76 to enhance the detail and/or increase the completeness of the three-dimensional model of the hydrocarbons 34 (e.g., as compared to a three-dimensional model of the hydrocarbons generated based on feedback from a single light detector). While the leak detection system 68 includes two light sources and two light detectors in the illustrated embodiment, in other embodiments, the leak detection system may include more or fewer light sources (e.g., 1, 2, 3, 4, 5, 6, or more) and/or more or fewer light detectors (e.g., 1, 2, 3, 4, 5, 6, or more). For example, in certain embodiments, the leak detection system may include a single light source configured to output emitted light into a respective region of the water, and the leak detection system may include multiple light detectors (e.g., 2, 3, 4, 5, 6, or more) configured to receive returned light from the region of the water. Utilizing a single light source may reduce the cost of the leak detection system, as compared to utilizing multiple light sources. Furthermore, while the first region of the water and the second region of the water overlap with one another in the illustrated embodiment, in other embodiments, the first and second regions of the water may not overlap. For example, each light source/light detector may be directed toward a different region of the water to facilitate detection of hydrocarbon leak(s) within different portions of the subsea structure/undersea equipment 62.

The three-dimensional model of the subsea structure/undersea equipment 62 may be stored within the memory 32 of the controller 28. For example, the three-dimensional model of the subsea structure/undersea equipment 62 may correspond to a computer-aided design (CAD) model of the subsea structure/undersea equipment 62. Alternatively or additionally, the three-dimensional model of the subsea structure/undersea equipment 62 may be generated by scanning the subsea structure/undersea equipment during a previous inspection operation (e.g., via a LIDAR system, via optical cameras, etc.) and then stored within the memory 32 of the controller 28.

Furthermore, in certain embodiments, the leak detection system 68 includes a first LIDAR system 66 communicatively coupled to the controller 28. The first LIDAR system 66 is configured to scan the subsea structure/undersea equipment 62 with one or more lasers and to output a first LIDAR signal indicative of the three-dimensional model of the subsea structure/undersea equipment 62. For example, the first LIDAR signal may be indicative of a point cloud of points on the surface of the subsea structure/undersea equipment 62. The controller 28 may generate the three-dimensional model of the subsea structure/undersea equipment 62 based on the first LIDAR signal. In addition, in certain embodiments, the leak detection system 68 may include a second LIDAR system 80 communicatively coupled to the controller 28. The second LIDAR system 80 is configured to scan the subsea structure/undersea equipment 62 with one or more lasers and to output a second LIDAR signal indicative of the three-dimensional model of the subsea structure/undersea equipment. For example, the second LIDAR signal may be indicative of a point cloud of points on the surface of the subsea structure/undersea equipment 62. The controller 28 may generate the three-dimensional model of the subsea structure/undersea equipment 62 based on the first LIDAR signal and the second LIDAR signal. Utilizing data from two LIDAR systems may enhance the detail and/or increase the completeness of the three-dimensional model of the subsea structure/undersea equipment. While the leak detection system includes two LIDAR systems in the illustrated embodiment, in other embodiments, the leak detection system may include more or fewer LIDAR systems (e.g., 0, 1, 2, 3, 4, 5, 6, or more).

Furthermore, in certain embodiments, the controller 28 is configured to generate the three-dimensional model of the subsea structure/undersea equipment based on the first detector signal indicative of the respective returned light and/or the second detector signal indicative of the respective returned light. As previously discussed, the returned light may include light at the hydrocarbon wavelength and light substantially at the emitted wavelength of the emitted light. The light at the hydrocarbon wavelength is indicative of hydrocarbons within the water. In addition, the returned light substantially at the emitted wavelength may be reflected from the subsea structure/undersea equipment. As discussed in detail below, the controller may generate the three-dimensional model of the subsea structure/undersea equipment based on the returned light substantially at the emitted wavelength. Accordingly, using the two different wavelengths, the controller 28 may generate the three-dimensional model of the hydrocarbons and the three-dimensional model of the subsea structure/undersea equipment.

While accessing a stored three-dimensional model of the subsea structure/undersea equipment, generating the three-dimensional model of the subsea structure/undersea equipment based on the LIDAR signal(s), and generating the three-dimensional model of the subsea structure/undersea equipment based on the detector signal(s) indicative of the returned light are disclosed above, in other embodiments, the three-dimensional model of the subsea structure/undersea equipment may be generated based on other suitable data and/or received from a suitable source. Furthermore, in certain embodiments, the three-dimensional model of the subsea structure/undersea equipment may be generated based on data from multiple sources (e.g., data stored within the controller memory, data from the LIDAR signal(s), data from the detector signal(s), other suitable data, or a combination thereof).

In certain embodiments, the controller 28 may be communicatively coupled to a user interface (e.g., including a display) and/or to other suitable controller(s) (e.g., a controller on a surface vessel, a controller at a remote terminal, etc.). The controller may be configured to output an output signal to the user interface and/or to the other controller(s) indicative of the position(s) of the hydrocarbons, thereby facilitating determination of the location of a hydrocarbon leak within the subsea structure/undersea equipment. Furthermore, in certain embodiments, the output signal may include a three-dimensional model of the hydrocarbons and/or a three-dimensional model of the subsea structure/undersea equipment. In addition, any of the suitable functions of the controller disclosed above with reference to FIG. 1 may be performed by the controller 28 of the illustrated embodiment (e.g., hydrocarbon concentration determination, automatic leak location determination, etc.).

Figure 3:
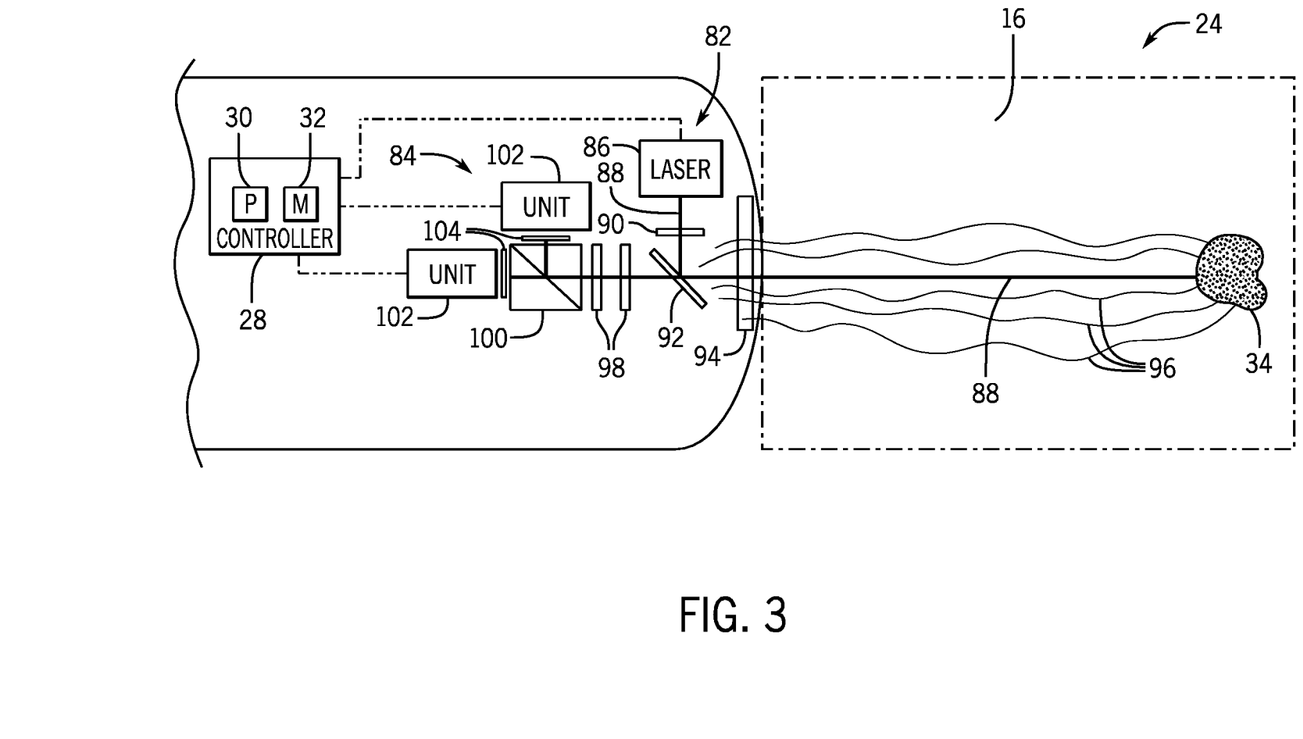
FIG. 3 is a schematic diagram of an embodiment of a light source and a light detector that may be employed within the leak detection system of FIG. 1 and/or within the leak detection system of FIG. 2.

FIG. 3 is a schematic diagram of an embodiment of a light source 82 and a light detector 84 that may be employed within the leak detection system of FIG. 1 and/or within the leak detection system of FIG. 2. For example, the illustrated light source 82 may correspond to the light source 22 of the leak detection system 12 of FIG. 1 and/or to one or more of the light sources 22, 72 of the leak detection system 68 of FIG. 2, and/or the illustrated light detector 84 may correspond to the light detector 26 of the leak detection system 12 of FIG. 1 and/or to one or more of the light detectors 26, 76 of the leak detection system 68 of FIG. 2. In the illustrated embodiment, the light source 82 includes a laser 86 that emits a laser beam 88 (e.g., emitted light). For example, the laser 86 may emit the laser beam 88 at a wavelength between 200 nm and 700 nm, between 300 nm and 600 nm, or between 350 nm and 500 nm. Emitting light at such a wavelength may substantially reduce absorption of the laser beam 88 (e.g., emitted light) by the water 16, thereby increasing the magnitude of the light that reaches the hydrocarbons 34. While the light source 82 includes a single laser 86 in the illustrated embodiment, in other embodiments, the light source 82 may include any suitable number of lasers (e.g., 0, 1, 2, 3, 4, 5, 6, or more) and/or any suitable number of other suitable light emitters (e.g., one or more light emitting diodes, one or more fluorescent lights, one or more incandescent lights, etc.).

In certain embodiments, the light/beam 88 emitted by the light source 82 may pass through one or more optical filters 90 configured to filter undesired wavelengths from the light/beam. However, in other embodiments, the optical filter(s) may be omitted. As illustrated, the light/beam 88 emitted by the light source 82 reaches a dichroic mirror 92, which is positioned downstream from the optical filter(s) 90. The dichroic mirror 92 (e.g., which may be an element of the light source) is configured to reflect light of certain wavelengths while enabling light of other wavelengths to pass through the dichroic mirror. In the illustrated embodiment, the dichroic mirror 92 is configured to reflect light at the wavelength(s) of the light/beam 88 and to enable light of other wavelengths to pass through the dichroic mirror 92. In the illustrated embodiment, light passage wavelengths of the dichroic mirror 92 are selected to enable passage of the light emitted by the hydrocarbons (e.g., as the hydrocarbons fluoresce in response to absorbing the light/beam 88). The light/beam 88 reflected by the dichroic mirror 92 is directed through a window 94 (e.g., window in an underwater vehicle) and into the surrounding water 16. In response to interaction between the light/beam 88 and the hydrocarbons 34 in the water 16, the hydrocarbons 34 absorb the energy of the light/beam 88 and fluoresce. However, the wavelength (e.g., hydrocarbon wavelength) of the light 96 emitted by the fluorescing hydrocarbons 34 (e.g., returned light) is shifted (e.g., red shifted) relative to the wavelength(s) of the light/beam 88 (e.g., emitted light). For example, the wavelength (e.g., hydrocarbon wavelength) of the light 96 from the fluorescing hydrocarbons 34 may be greater than the wavelength of the light/beam 88. The light 96 from the fluorescing hydrocarbons 34 (e.g., returned light) passes through the window 94 and the dichroic mirror 92. After passing through the dichroic mirror 92, the light 96 from the fluorescing hydrocarbons 34 may pass through one or more filters 98 that filter certain wavelengths of light. The filtered wavelengths may correspond to wavelengths of light emitted by other materials in the fluid, e.g., light emitted by the fluorescence of substances other than the hydrocarbons. While the illustrated embodiment includes filters positioned downstream from the dichroic mirror, in other embodiments, the filters may be omitted.

After passing through the filters 98, the light 96 enters a beam splitter 100 of the light detector 84. The beam splitter 100 splits the beam of the light 96, thereby enabling multiple light detector units 102 (e.g., photomultiplier module(s), avalanche photodiode(s), simple photodiode(s), etc.) of the light detector 84 to receive the light 96. Each light detector unit 102 may be configured to monitor a selected wavelength or a selected wavelength range within the light 96. For example, one light detector unit 102 may monitor a first wavelength of the light 96 associated with a first type of hydrocarbon, and another light detector unit 102 may be configured to monitor a second wavelength of the light 96 associated with a second type of hydrocarbon. In some embodiments, one or more optical filters 104 (e.g., optical bandpass filter(s)) of the light detector 84 may be positioned between the beam splitter 100 and each light detector unit 102 to substantially block wavelengths other than the respective selected wavelength. While optical filter(s) are positioned upstream of each light detector unit in the illustrated embodiment, in other embodiments, at least one light detector unit may receive light directly from the beam splitter. While the light detector 84 includes one beam splitter 100 and two light detector units 102 in the illustrated embodiment, in other embodiments, the light detector may include additional beam splitters (e.g., 1, 2, 3, 4, etc.) and/or additional light detector units 102 (e.g., 1, 2, 3, 4, etc.), thereby enabling the light detector to detect additional wavelength(s) associated with additional type(s) of hydrocarbons.

As previously discussed, the light detector 84 is configured to output a detector signal to the controller 28 indicative of the returned light. The detector signal may include a first signal/data indicative of the returned light at the first wavelength and a second signal/data indicative of the returned light at the second wavelength. As previously discussed, each wavelength may be a hydrocarbon wavelength indicative of presence of a respective type of hydrocarbon within the water. Accordingly, the controller 28 may detect hydrocarbons of a first type in response to detecting the first hydrocarbon wavelength, and the controller 28 may detect hydrocarbons of a second type in response to detecting the second hydrocarbon wavelength. As a result, the leak detection system may detect two types of hydrocarbons within the water. In addition, in embodiments in which the light detector includes three or more light detector units, the leak detection system may detect a corresponding number of types of hydrocarbons within the water. The ability to differentiate the type(s) of hydrocarbons within the water may facilitate identification of the location(s) of the leak(s) (e.g., based on location(s) within the subsea structure/undersea equipment that contain the type(s) of hydrocarbons detected). For example, the subsea structure/undersea equipment may contain a first type of hydrocarbon at a first location, and the subsea structure/undersea equipment may contain a second type of hydrocarbon at a second location. In response to detection of the first type of hydrocarbon, the location of the leak may be identified as the first location, and in response to detection of the second type of hydrocarbon, the location of the leak may be identified as the second location. In embodiments in which the leak detection system is disposed within an underwater vehicle, the controller may control the propulsion system to move the underwater vehicle toward the identified location of the leak to facilitate determination of the precise location and magnitude of the leak.

While detecting each type of hydrocarbon in response to detecting a respective hydrocarbon wavelength is disclosed above, in certain embodiments, the controller may utilize other techniques to identify the type(s) of hydrocarbons present within the water. For example, the controller may determine the hydrocarbon type(s) based on the magnitudes of multiple detected wavelengths. In certain embodiments, the control stores data (e.g., in the form of a table, etc.) that associates each hydrocarbon type with a set of relative magnitudes of multiple wavelengths. In such embodiments, the controller may determine each type of hydrocarbon present within the water by matching the relative magnitudes of the detected wavelengths to a respective set of relative wavelength magnitudes stored in the controller.

While the light detector includes multiple light detector units in the illustrated embodiment, in other embodiments, the light detector may include a single light detector unit. For example, the single light detector unit may be configured to monitor a single wavelength/range of wavelengths to facilitate detection of a single type of hydrocarbon. Furthermore, in certain embodiments, the single light detector unit may be configured to monitor multiple wavelengths, and the controller may be configured to detect multiple types of hydrocarbons based on the hydrocarbon wavelength of each hydrocarbon type. In addition, while detection of multiple wavelengths for detecting multiple types of hydrocarbons is disclosed above, in certain embodiments, multiple wavelengths may be detected for other purposes, such as compensating for light absorption, as disclosed in detail below.

As previously discussed, the controller 28 is configured to determine at least one position of the hydrocarbons within the monitored region of the water 16 based on a time difference between the first time at which the light/beam 88 (e.g., emitted light) is output from the light source 82 (e.g., laser 86) and a second time at which the light 96 (e.g., returned light) at the hydrocarbon wavelength is received at the light detector 84 (e.g., at the respective light detector unit(s) 102). For example, in certain embodiments, the controller 28 is communicatively coupled to the light source 82 (e.g., to the laser 86). The controller 28 may be configured to instruct the light source 82 to emit a pulse of light (e.g., emitted light) at the first time and/or determine the first time at which the light source 82 emits the pulse of light (e.g., emitted light). In addition, the controller 28 may determine the second time at which the light 96 at the hydrocarbon wavelength is received at the light detector 84 based on the detector signal. The controller 28 may then determine the position of the hydrocarbons based on the difference between the first time and the second time. In certain embodiments, the position includes the distance between the light source/light detector and the hydrocarbons (e.g., which the controller may determine based on the speed of light through the water and the difference between the first and second times).

In certain embodiments, the controller 28 may generate a three-dimensional model of the hydrocarbons 34 within the water 16 based on multiple positions of the hydrocarbons 34. For example, the controller 28, which is communicatively coupled to the light source 82 in the illustrated embodiment, may instruct the light source 82 (e.g., an actuator of the light source coupled to the laser 86, an actuator of the light source coupled to the dichroic mirror 92, another suitable actuator, or a combination thereof) to move through a scanning pattern (e.g., including up/down movement and/or left/right movement), such that the light/beam 88 (e.g., emitted light) scans through the region 24 (e.g., volume) of the water 16. In addition, the controller 28 may instruct the light source 82 (e.g., the laser 86) to emit pulses of the light/beam 88 (e.g., emitted light) as the light source 82 (e.g., the laser 86 and/or the dichroic mirror 92) moves through the scanning pattern. After each pulse of the light/beam 88, the controller 28 may determine the position of a respective portion of the hydrocarbons 34 within the region 24 based on a time difference between a first time at which the light/beam 88 is output from the light source 82 and a second time at which the light 96 (e.g., returned light) at the hydrocarbon wavelength is received at the light detector 84. Once the scanning pattern is complete, the controller 28 may generate a three-dimensional model (e.g., a point cloud, a polygon mesh, etc.) of the hydrocarbons based on the positions of the hydrocarbons and output the output signal indicative of the three-dimensional model. For example, the controller 28 may output the output signal indicative of the three-dimensional model of the hydrocarbons to a user interface (e.g., a display of a user interface). The user interface (e.g., the display of the user interface) may present an image of the three-dimensional model to an operator, thereby enabling the operator to view the size and shape of the hydrocarbons 34 within the region 24 of the water 16.

In certain embodiments, the controller 28 may be configured to determine a concentration of the hydrocarbons 34 within the water 16. For example, the controller 28 may determine the hydrocarbon concentration based on a magnitude of the light 96 and the position of the hydrocarbons 34. For example, a higher magnitude of the light 96 (e.g., returned light) and a greater distance between the light detector 84 and the hydrocarbons 34 may indicate a higher concentration of hydrocarbons. In addition, a lower magnitude of the light 96 (e.g., returned light) and a smaller distance between the light detector 84 and the hydrocarbons 34 may indicate a lower concentration of the hydrocarbons. In embodiments in which the controller is configured to generate a three-dimensional model of the hydrocarbons within the region of the water, the controller may determine the hydrocarbon concentration at each hydrocarbon position, thereby establishing a three-dimensional hydrocarbon concentration model. Such a model may be used by the operator to determine the location of the hydrocarbon leak within the subsea structure/undersea equipment (e.g., the higher concentration may be located closer to the source of the leak). Furthermore, in certain embodiments, the controller 28 may automatically determine the location of the hydrocarbon leak within the subsea structure/undersea equipment (e.g., by determining the point on the subsea structure/undersea equipment closest to the highest concentration of the hydrocarbons).

In certain embodiments, the fluorescence response of the hydrocarbons may be used to identify the type of hydrocarbons detected. As previously discussed, the hydrocarbons absorb energy from the light/beam and fluoresce. The intensity/magnitude of the light emitted by the fluorescence of the hydrocarbons decreases (e.g., rapidly) over time, thereby establishing a characteristic fluorescence response. The controller may match the characteristic fluorescence response to one of a set of stored characteristic fluorescence responses to identify the type of detected hydrocarbon.

The fluorescence lifetime of the hydrocarbons (e.g., typically on the scale of nanoseconds) and the absorption of the light 96 by the hydrocarbons and other molecules in the path of the light 96 between the detected hydrocarbons 34 and the light detector 84 may interfere with hydrocarbon fluorescence monitoring. For example, the time profile of the fluorescence response may be altered and/or the light detector may not accurately monitor the intensity of the light emitted by the fluorescing hydrocarbons if the light detector detects the light from the fluorescing hydrocarbons after the maximum fluorescent emission. Accordingly, in certain embodiments, the controller may utilize an exponential model of the fluorescence response to adjust the monitored intensity. For example, the time delay between the maximum fluorescent emission and the detected emission may be used in conjunction with the exponential model to determine the magnitude of the maximum fluorescent emission, thereby enabling the controller to determine the intensity and the fluorescence response more accurately. Furthermore, absorption of the light 96 by the hydrocarbons may be represented as an exponentially decreasing function with wavelength. Accordingly, the light detector may be configured to monitor multiple wavelengths, and the controller may be configured to determine the approximate absorption function based on the intensity of the received light at each of the multiple wavelengths. The controller may then use the approximate absorption function to compensate for the light absorption.

In the illustrated embodiment, the mirror 92 is a dichroic mirror that reflects light at the wavelength(s) of the light/beam 88 and enables light of the wavelength(s) of the light 96 from the fluorescing hydrocarbons to pass through the mirror. In other embodiments, the mirror may be a dichroic mirror that reflects light at the wavelength(s) of the light from the fluorescing hydrocarbons and enables light of the wavelength(s) of the emitted light/beam to pass through the mirror. In such embodiments, the positions of the light source and the light detector may be reversed. Furthermore, in certain embodiments, the mirror may be a small mirror that reflects the emitted light/beam, while enabling the light from the fluorescing hydrocarbons to pass around the mirror. Furthermore, in certain embodiments, the mirror may be a larger mirror having an aperture. In such embodiments, the emitted light/beam may pass through the aperture and the light from the fluorescing hydrocarbons may be reflected toward the light detector. In certain embodiments, the mirror may be omitted, and the light source (e.g., the laser of the light source) may be offset from the light detector.

Figure 4:
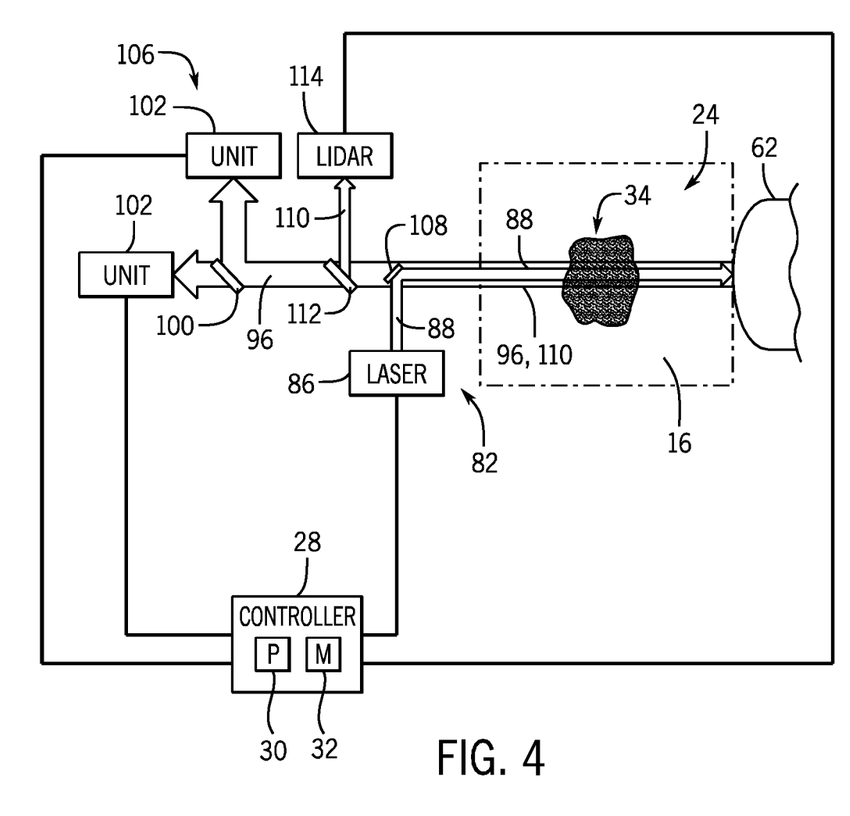
FIG. 4 is a schematic diagram of an embodiment of a light source and a light detector that may be employed within the leak detection system of FIG. 1 and/or within the leak detection system of FIG. 2.

FIG. 4 is a schematic diagram of an embodiment of a light source 82 and a light detector 106 that may be employed within the leak detection system of FIG. 1 and/or within the leak detection system of FIG. 2. For example, the illustrated light source 82 may correspond to the light source 22 of the leak detection system 12 of FIG. 1 and/or to one or more of the light sources 22, 72 of the leak detection system 68 of FIG. 2, and/or the illustrated light detector 106 may correspond to the light detector 26 of the leak detection system 12 of FIG. 1 and/or to one or more of the light detectors 26, 76 of the leak detection system 68 of FIG. 2. In the illustrated embodiment, the light source 82 includes a laser 86 that emits a laser beam 88 (e.g., emitted light). For example, the laser 86 may emit the laser beam 88 at a wavelength between 200 nm and 700 nm, between 300 nm and 600 nm, or between 350 nm and 500 nm. As previously discussed, emitting light at such a wavelength may substantially reduce absorption of the laser beam 88 (e.g., emitted light) by the water 16, thereby increasing the magnitude of the light that reaches the hydrocarbons 34 and the subsea structure/undersea equipment 62. While the light source 82 includes a single laser 86 in the illustrated embodiment, in other embodiments, the light source 82 may include any suitable number of lasers (e.g., 0, 1, 2, 3, 4, 5, 6, or more) and/or any suitable number of other suitable light emitters (e.g., one or more light emitting diodes, one or more fluorescent lights, one or more incandescent lights, etc.).

In the illustrated embodiment, the light/beam 88 emitted by the light source 82 is reflected by a mirror 108 (e.g., which may be an element of the light source 82). As illustrated, the light from the light/beam 88 reflected by the mirror 108 is directed into the water 16. In response to interaction between the light/beam 88 and the hydrocarbons 34 in the water 16, the hydrocarbons 34 absorb the energy of the light/beam 88 and fluoresce. As previously discussed, the wavelength (e.g., hydrocarbon wavelength) of the light 96 emitted by the fluorescing hydrocarbons 34 (e.g., returned light) is shifted (e.g., red shifted) relative to the wavelength(s) of the light/beam 88 (e.g., emitted light). For example, the wavelength (e.g., hydrocarbon wavelength) of the light 96 from the fluorescing hydrocarbons 34 may be greater than the wavelength of the light/beam 88. The light 96 from the fluorescing hydrocarbons 34 (e.g., returned light) passes around the mirror 108 because the reflective area of the mirror is significantly less than the cross-sectional area of the light 96. In addition, the light/beam 88 may reflect off the subsea structure/undersea equipment 62, thereby establishing reflected light 110 having substantially the same wavelength as the light/beam 88 (e.g., the wavelength of the emitted light and the reflected light may be slightly different due to a Doppler shift, among other factors). The reflected light 110 (e.g., returned light) passes around the mirror 108 because the reflective area of the mirror is significantly less than the cross-sectional area of the reflected light 110. Accordingly, the returned light received by the light detector 106 may include the light 96 from the fluorescing hydrocarbons and the reflected light 110 from the subsea structure/undersea equipment 62.

As illustrated, the returned light, including the light 96 from the fluorescing hydrocarbons and the reflected light 110 from the subsea structure/undersea equipment 62, encounters a dichroic mirror 112 positioned downstream from the mirror 108. The dichroic mirror 112 is configured to reflect light of certain wavelengths while enabling light of other wavelengths to pass through the dichroic mirror. In the illustrated embodiment, the dichroic mirror 112 is configured to reflect light at the wavelength of the reflected light 110 (e.g., which may be substantially equal to the emitted light) and to enable light of other wavelengths to pass through the dichroic mirror 112. In the illustrated embodiment, light passage wavelengths of the dichroic mirror 112 are selected to enable passage of the light 96 from the fluorescing hydrocarbons. Accordingly, the dichroic mirror 112 may reflect the reflected light 110 toward a LIDAR receiver 114, and the dichroic mirror 112 may enable the light 96 to pass through the dichroic mirror 112 to the beam splitter 100/light detector units 102. While the dichroic mirror 112 is configured to reflect light at the wavelength of the reflected light 110 and to enable light at the wavelength(s) of the light 96 to pass through the dichroic mirror 112 in the illustrated embodiment, in other embodiments, the dichroic mirror may be configured to reflect the light emitted by the fluorescing hydrocarbons and to enable passage of the reflected light. In such embodiments, the positions of the LIDAR receiver and the beam splitter/light detector units may be switched.

As previously discussed with regard to the embodiment of FIG. 3, the beam splitter 100 splits the beam of the light 96, thereby enabling the light detector units 102 (e.g., photomultiplier module(s), avalanche photodiode(s), simple photodiode(s), etc.) of the light detector 106 to receive the light 96. Each light detector unit 102 may be configured to monitor a selected wavelength or a selected wavelength range within the light 96. For example, one light detector unit 102 may monitor a first wavelength of the light 96 associated with a first type of hydrocarbon, and another light detector unit 102 may be configured to monitor a second wavelength of the light 96 associated with a second type of hydrocarbon. While the light detector 106 includes one beam splitter 100 and two light detector units 102 in the illustrated embodiment, in other embodiments, the light detector may include additional beam splitters (e.g., 1, 2, 3, 4, etc.) and/or additional light detector units 102 (e.g., 1, 2, 3, 4, etc.), thereby enabling the light detector to detect additional wavelength(s) associated with additional type(s) of hydrocarbons. Furthermore, in certain embodiments, the beam splitter may be omitted, and the light detector may include a single light detector unit.

As previously discussed, the light detector 106 is configured to output a detector signal to the controller 28 indicative of the returned light. The detector signal may include a respective signal/data indicative of the returned light at each wavelength monitored by the light detector unit(s). As previously discussed, each wavelength may be a hydrocarbon wavelength indicative of presence of a respective type of hydrocarbon within the water. Accordingly, the controller 28 may detect hydrocarbons of one or more types in response to detecting the respective hydrocarbon wavelength(s).

In addition, the LIDAR receiver 114 receives the reflected light 110 from the subsea structure/undersea equipment 62 and generates a respective LIDAR signal/data. Accordingly, the detector signal output from the light detector 106 to the controller 28 includes a hydrocarbon signal/data from the light detector unit(s) and a LIDAR signal/data from the LIDAR receiver. The controller 28 receives the detector signal, including the LIDAR signal/data, and determines the shape of objects within the field of view of the light source/light detector. For example, the LIDAR signal/data may enable the controller 28 to generate the three-dimensional model of the subsea structure/undersea equipment 62.

In certain embodiments, the controller 28 may generate a three-dimensional model of the hydrocarbons 34 within the region 24 of the water 16 based on multiple positions of the hydrocarbons 34. For example, the controller 28, which is communicatively coupled to the light source 82 in the illustrated embodiment, may instruct the light source 82 (e.g., an actuator of the light source coupled to the laser 86, an actuator of the light source coupled to the mirror 108, another suitable actuator, or a combination thereof) to move through a scanning pattern (e.g., including up/down movement and/or left/right movement), such that the light/beam 88 (e.g., emitted light) scans through the region 24 (e.g., volume) of the water 16. In addition, the controller 28 may instruct the light source 82 (e.g., the laser 86) to emit pulses of the light/beam 88 (e.g., emitted light) as the light source 82 (e.g., the laser 86 of the light source 82 and/or the mirror 108 of the light source) moves through the scanning pattern. After each pulse of the light/beam 88, the controller 28 may determine the position of a respective portion of the hydrocarbons 34 within the region 24 based on a time difference between a first time at which the light/beam 88 is output from the light source 82 and a second time at which the light 96 (e.g., returned light) at the hydrocarbon wavelength is received at the light detector 106 (e.g., the light detector unit(s) 102). Once the scanning pattern is complete, the controller 28 may generate a three-dimensional model (e.g., a point cloud, a polygon mesh, etc.) of the hydrocarbons based on the positions of the hydrocarbons and output the output signal indicative of the three-dimensional model. For example, the controller 28 may output the output signal indicative of the three-dimensional model of the hydrocarbons to a user interface (e.g., a display of a user interface). The user interface (e.g., the display of the user interface) may present an image of the three-dimensional model of the hydrocarbons to an operator, thereby enabling the operator to view the size and shape of the hydrocarbons 34 within the region 24 of the water 16.

Furthermore, in certain embodiments, the controller 28 is configured to generate a three-dimensional model of the subsea structure/undersea equipment 62 based on the detector signal indicative of the returned light, which includes the LIDAR signal/data. As previously discussed, the controller 28, which is communicatively coupled to the light source 82 in the illustrated embodiment, may instruct the light source 82 (e.g., an actuator of the light source coupled to the laser 86, an actuator of the light source coupled to the mirror 108, another suitable actuator, or a combination thereof) to move through a scanning pattern (e.g., including up/down movement and/or left/right movement), such that the light/beam 88 (e.g., emitted light) scans through the region 24 (e.g., volume) of the water 16. In addition, the controller 28 may instruct the light source 82 (e.g., the laser 86) to emit pulses of the light/beam 88 (e.g., emitted light) as the light source 82 (e.g., the laser 86 of the light source 82 and/or the mirror 108 of the light source) moves through the scanning pattern. After each pulse of the light/beam 88, the controller 28 may determine the position of a respective portion of the subsea structure/undersea equipment 62 based on a time difference between a first time at which the light/beam 88 is output from the light source 82 and a second time at which the reflected light 110 (e.g., returned light) is received at the light detector 106 (e.g., at the LIDAR receiver 114). Once the scanning pattern is complete, the controller 28 may generate a three-dimensional model (e.g., a point cloud, a polygon mesh, etc.) of the subsea structure/undersea equipment 62 based on the positions of the respective portions of the subsea structure/undersea equipment 62 and output the output signal indicative of the three-dimensional model. For example, the controller 28 may output the output signal indicative of the three-dimensional model of the subsea structure/undersea equipment to a user interface (e.g., a display of a user interface). The user interface (e.g., the display of the user interface) may present an image of the three-dimensional model of the hydrocarbons and the three-dimensional model of the subsea structure/undersea equipment 62 to an operator, thereby enabling the operator to view the size and shape of the hydrocarbons 34 relative to the physical structure of the subsea structure/undersea equipment 62. In addition, the image of the three-dimensional model of the subsea structure/undersea equipment may enable the operator to visually identify the source of the hydrocarbon leak (e.g., by observing a deformation within the subsea structure/undersea equipment).

In the illustrated embodiment, the mirror 108 is a small mirror that reflects the light/beam 88, while enabling the returned light, including the light 96 from the fluorescing hydrocarbons and the reflected light 110 from the subsea structure/undersea equipment, to pass around the mirror 108. However, in other embodiments, the mirror may be a larger mirror having an aperture. In such embodiments, the light/beam 88 may pass through the aperture and the returned light may be reflected toward the LIDAR receiver and/or the beam splitter/light detector unit(s). Furthermore, in certain embodiments, the mirror may be omitted, and the light source (e.g., the laser of the light source) may be offset from the light detector. Furthermore, any of the filter(s) disclosed above with reference to FIG. 3 may be utilized within the embodiment of FIG. 4, any of the functions performed by the controller of FIG. 3 may be performed by the controller of FIG. 4, and any of the variations disclosed above with reference to the embodiment of FIG. 3 may apply to the embodiment of FIG. 4.

In the embodiments disclosed above, a single controller (e.g., the underwater vehicle controller) is used to perform certain functions disclosed herein, including but not limited to detecting hydrocarbons, determined position(s) of the hydrocarbons, generating a three-dimensional model of the hydrocarbons, and generating a three-dimensional model of the subsea structure/undersea equipment. However, in other embodiments, these functions, among others, may be performed by another suitable controller (e.g., the surface vessel controller, etc.) or a combination of controllers (e.g., the underwater vehicle controller and the surface vessel controller, etc.). In addition, while the light source, the light detector, and the controller are configured to detect hydrocarbons within the region of the water in the embodiments disclosed herein, in other embodiments, the light source, the light detector, and the controller may be configured to detect other object(s) and/or chemical(s) within the water (e.g., biological material, particulate material, etc.). Furthermore, while the light source, the light detector, and the controller are configured to detect object(s)/chemical(s) (e.g., hydrocarbons) within water in the embodiments disclosed herein, in other embodiments, the light source, the light detector, and the controller may be configured to detect object(s)/chemical(s) within other suitable fluids (e.g., air, etc.). In addition, while the light source and the light detector are disclosed as being mounted to an underwater vehicle and a subsea structure/undersea equipment in the embodiments disclosed herein, in other embodiments, the light source and the light detector may be mounted to any other suitable structure (e.g., a ground-based vehicle, a handheld device, etc.).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A leak detection system, comprising:
a light source configured to output emitted light into a region of water;
a light detector configured to receive returned light from the region of the water and to output a detector signal indicative of the returned light;
a mount configured to couple the light source and the light detector to a subsea structure; and
at least one controller communicatively coupled to the light detector, wherein the at least one controller comprises a memory and a processor, and the at least one controller is configured to:
receive the detector signal;
detect hydrocarbons within the region of the water in response to detecting a hydrocarbon wavelength within the returned light indicative of presence of the hydrocarbons within the region of the water;
determine at least one position of the hydrocarbons within the region of the water based on a time difference between a first time at which the emitted light is output from the light source and a second time at which the returned light at the hydrocarbon wavelength is received at the light detector;
generate a three-dimensional model of the subsea structure based on the detector signal; and
output an output signal indicative of the at least one position of the hydrocarbons within the region of the water and the three-dimensional model of the subsea structure.

2. The leak detection system of claim 1, wherein the at least one position of the hydrocarbons comprises a plurality of positions of the hydrocarbons, the at least one controller is configured to generate a three-dimensional model of the hydrocarbons within the region of the water based on the plurality of positions of the hydrocarbons, and the output signal is indicative of the three-dimensional model of the hydrocarbons within the region of the water and the three-dimensional model of the subsea structure.

3. The leak detection system of claim 1, wherein the light detector comprises a first light detector unit and a second light detector unit, the first light detector unit is configured to receive the returned light at the hydrocarbon wavelength, the second light detector unit is configured to receive the returned light at a second hydrocarbon wavelength indicative of presence of second hydrocarbons within the region of the water, the at least one controller is configured to detect the second hydrocarbons within the region of the water in response to detecting the second hydrocarbon wavelength within the returned light, the at least one controller is configured to determine at least one position of the second hydrocarbons within the region of the water based on a second time difference between the first time at which the emitted light is output from the light source and a third time at which the returned light at the second hydrocarbon wavelength is received at the light detector, and the output signal is indicative of the at least one position of the hydrocarbons, the at least one position of the second hydrocarbons, and the three-dimensional model of the subsea structure.

4. The leak detection system of claim 1, comprising a light detection and ranging (LIDAR) system, wherein the LIDAR system is configured to output a LIDAR signal indicative of the three-dimensional model of the subsea structure, and the at least one controller is configured to generate the three-dimensional model of the subsea structure based on the LIDAR signal and the detector signal.

5. The leak detection system of claim 1, wherein the at least one controller is configured to generate the three-dimensional model of the subsea structure based on a stored model of the subsea structure and the detector signal.

6. The leak detection system of claim 1, wherein the at least one controller is configured to determine a concentration of the hydrocarbons within the region of the water based on a magnitude of the returned light at the hydrocarbon wavelength and the at least one position of the hydrocarbons.

7. The leak detection system of claim 1, wherein the light source and the light detector are configured to be coupled to an underwater vehicle.

8. The leak detection system of claim 1, wherein the light detector comprises a light detection and ranging (LIDAR) receiver configured to receive the returned light and to generate LIDAR data, the detector signal output by the light detector includes the LIDAR data, and the at least one controller is configured to generate the three-dimensional model of the subsea structure based on the LIDAR data.

9. The leak detection system of claim 8, comprising a dichroic mirror, wherein the light source is configured to output the emitted light at an emitted wavelength, the dichroic mirror is configured to reflect the returned light substantially at the emitted wavelength toward the LIDAR receiver, and the dichroic mirror is configured to enable the returned light at the hydrocarbon wavelength to pass through the dichroic mirror.

10. An underwater vehicle, comprising:
a propulsion system configured to control movement of the underwater vehicle through water; and
a leak detection system, comprising:
a light source configured to output emitted light into a region of the water;
a light detector configured to receive returned light from the region of the water and to output a detector signal indicative of the returned light; and
at least one controller communicatively coupled to the light detector and to the propulsion system, wherein the at least one controller comprises a memory and a processor, and the at least one controller is configured to:
receive the detector signal;
detect hydrocarbons within the region of the water in response to detecting a hydrocarbon wavelength within the returned light indicative of presence of the hydrocarbons within the region of the water;
determine a plurality of positions of the hydrocarbons within the region of the water based on respective time differences between respective first times at which the emitted light is output from the light source and respective second times at which the returned light at the hydrocarbon wavelength is received at the light detector;
determine an intersection between the hydrocarbons and a subsea structure based on the plurality of positions of the hydrocarbons and a three-dimensional model of the subsea structure;
control the propulsion system to move the underwater vehicle to a location, an orientation, or a combination thereof, that directs the light source and the light detector toward the intersection.

11. The underwater vehicle of claim 10, wherein the at least one controller is configured to:
generate a three-dimensional model of the hydrocarbons within the region of the water based on the plurality of positions of the hydrocarbons; and
output an output signal indicative of the three-dimensional model of the hydrocarbons, the three-dimensional model of the subsea structure, or a combination thereof.

12. The underwater vehicle of claim 10, wherein the leak detection system comprises a light detection and ranging (LIDAR) system, wherein the LIDAR system is configured to output a LIDAR signal indicative of the three-dimensional model of the subsea structure, and the at least one controller is configured to generate the three-dimensional model of the subsea structure based on the LIDAR signal.

13. The underwater vehicle of claim 10, wherein the at least one controller is configured to control the propulsion system to move the underwater vehicle to a plurality of locations while directing the light source and the light detector toward the intersection to enable the at least one controller to determine an increased number of positions of the plurality of positions of the hydrocarbons within the region of the water.

14. The underwater vehicle of claim 10, wherein the at least one controller is configured to generate the three-dimensional model of the subsea structure based on the detector signal indicative of the returned light.

15. The underwater vehicle of claim 14, wherein the light detector comprises a light detection and ranging (LIDAR) receiver configured to receive the returned light and to generate LIDAR data, the detector signal output by the light detector includes the LIDAR data, and the at least one controller is configured to generate the three-dimensional model of the subsea structure based on the LIDAR data.

16. A leak detection system, comprising:
a light source configured to output emitted light into a region of water;
a light detector configured to receive returned light from the region of the water and to output a detector signal indicative of the returned light;
a mount configured to couple the light source and the light detector to a subsea structure; and
at least one controller communicatively coupled to the light detector, wherein the at least one controller comprises a memory and a processor, and the at least one controller is configured to:
receive the detector signal;
detect hydrocarbons within the region of the water in response to detecting a hydrocarbon wavelength within the returned light indicative of presence of the hydrocarbons within the region of the water;
determine a plurality of positions of the hydrocarbons within the region of the water based on respective time differences between respective first times at which the emitted light is output from the light source and respective second times at which the returned light at the hydrocarbon wavelength is received at the light detector;
generate a three-dimensional model of the hydrocarbons within the region of the water based on the plurality of positions of the hydrocarbons;
determine a location of a leak of the hydrocarbons from the subsea structure based on the three-dimensional model of the hydrocarbons and a three-dimensional model of the subsea structure; and
output an output signal indicative of the location of the leak.

17. The leak detection system of claim 16, wherein the at least one controller is configured to generate the three-dimensional model of the subsea structure based on the detector signal indicative of the returned light.

18. The leak detection system of claim 16, comprising a light detection and ranging (LIDAR) system, wherein the LIDAR system is configured to output a LIDAR signal indicative of the three-dimensional model of the subsea structure, and the at least one controller is configured to generate the three-dimensional model of the subsea structure based on the LIDAR signal.

* * * * *